US010216660B1

(12) United States Patent
Jonnala et al.

(10) Patent No.: US 10,216,660 B1
(45) Date of Patent: Feb. 26, 2019

(54) METHOD AND SYSTEM FOR INPUT/OUTPUT (IO) SCHEDULING IN A STORAGE SYSTEM

(71) Applicant: EMC IP Holding Company LLC, Hopkinton, MA (US)

(72) Inventors: Uday Kiran Jonnala, Cupertino, CA (US); Pradeep Thomas, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/649,580

(22) Filed: Jul. 13, 2017

(51) Int. Cl.
*G06F 3/06* (2006.01)
*G06F 13/20* (2006.01)

(52) U.S. Cl.
CPC .............. *G06F 13/20* (2013.01); *G06F 3/067* (2013.01); *G06F 3/0611* (2013.01); *G06F 3/0659* (2013.01); *G06F 2213/16* (2013.01)

(58) Field of Classification Search
CPC ...... G06F 3/0659; G06F 3/0611; G06F 3/061; G06F 13/1626
USPC .......................................................... 710/45
See application file for complete search history.

(56) References Cited

U.S. PATENT DOCUMENTS

| | | | | |
|---|---|---|---|---|
| 6,553,476 B1* | 4/2003 | Ayaki | ................... | G06F 3/0601 386/E5.042 |
| 6,931,501 B1* | 8/2005 | Narayanaswamy | .. | G06F 3/0613 710/32 |
| 7,032,041 B2* | 4/2006 | Sahara | .................... | G06F 3/061 710/36 |
| 7,058,850 B2* | 6/2006 | Cochran | ............. | G06F 11/1443 714/4.4 |
| 7,277,984 B2* | 10/2007 | Ghosal | .................. | G06F 3/0611 710/1 |
| 7,574,538 B1* | 8/2009 | Yochai | .................. | G06F 3/0613 710/36 |
| 7,644,221 B1* | 1/2010 | Chan | ..................... | G06F 13/387 710/306 |
| 7,802,040 B2* | 9/2010 | Aldworth | .............. | G06F 13/362 710/110 |
| 7,991,975 B2* | 8/2011 | Tanoue | .................. | G06F 3/0611 711/167 |
| 8,239,589 B1* | 8/2012 | Certain | ............... | G06F 13/1626 710/39 |
| 8,732,393 B2* | 5/2014 | Iwasaki | ................. | G06F 3/0611 711/111 |
| 9,026,748 B2* | 5/2015 | Staelin | .................. | G06F 9/5083 711/112 |

(Continued)

*Primary Examiner* — Brian T Misiura
(74) *Attorney, Agent, or Firm* — Womble Bond Dickinson (US) LLP

(57) ABSTRACT

According to some embodiment, a backup storage system receives a plurality of input/output (IO) requests at the storage system. The IO requests include random IO requests and sequential IO requests. The storage system determines whether there is a pending random IO request from the plurality of IO requests. In response to determining that there is a pending random IO request, the storage system determines whether a total latency of the sequential IO requests exceeds a predicted latency of the pending random IO request. The storage system services the pending random IO request in response to determining that the total latency of the sequential IO requests exceeds the predicted latency of the pending random IO request.

20 Claims, 5 Drawing Sheets

(56) References Cited

U.S. PATENT DOCUMENTS

| | | | |
|---|---|---|---|
| 9,069,616 B2 * | 6/2015 | Kadatch | G06F 9/5027 |
| 9,304,951 B1 * | 4/2016 | Chatterjee | G06F 13/161 |
| 9,396,067 B1 * | 7/2016 | Subramanian | G06F 11/1088 |
| 9,594,781 B2 * | 3/2017 | Ghodsnia | G06F 17/30306 |

* cited by examiner

US 10,216,660 B1

METHOD AND SYSTEM FOR INPUT/OUTPUT (IO) SCHEDULING IN A STORAGE SYSTEM

FIELD OF THE INVENTION

Embodiments of the present invention relate generally to data storage systems. More particularly, embodiments of the invention relate to method and system for input/output (IO) scheduling in a data storage system.

BACKGROUND

Backup storage systems traditionally have been designed and optimized such that data is stored and restored from the backup storage systems in a sequential manner. Modern backup technologies, such as VM Instant Access/Instant Restore from EMC and changed block tracking (CBT), however do not merely access data sequentially. Instead, such modern backup technologies may access data both sequentially and randomly, i.e., mixed input/output (IO) workload. Generally, a sequential IO workload has better latency performance as opposed to a random IO workload as accessing data sequentially is much faster than accessing data randomly due to the way a storage device, for example a hard disk drive (HDD), operates.

In a mixed IO workload scenario, however, the challenges to consider are: (a) predictable latency for random IO workloads and (b) sufficient throughput for sequential IO workloads. With respect to random IO workloads, read requests may occur synchronously. Although system response may be minimally affected by a write latency (the time required to service a write request), read latency (the time required to service a read request) however poses a greater challenge. Complicating matters, read requests may be dependent on each other. As an example, in a random IO workload, consider reading an image file where each read occurs in term of 4 KB read chunks. The reading of a subsequent chunk (or next file, for that matter), however, may not begin until a previous chunk is read from a storage device (e.g., HDD). Thus, if a particular read request is individually starved, the total latency may compound and exponentially grow, thereby impacting the storage system's performance.

With respect to sequential IO workloads, traditional backup storage systems may depend on the throughput to ensure that a backup window is not exceeded, and that a client backup software does not timeout due to a high IO response time.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
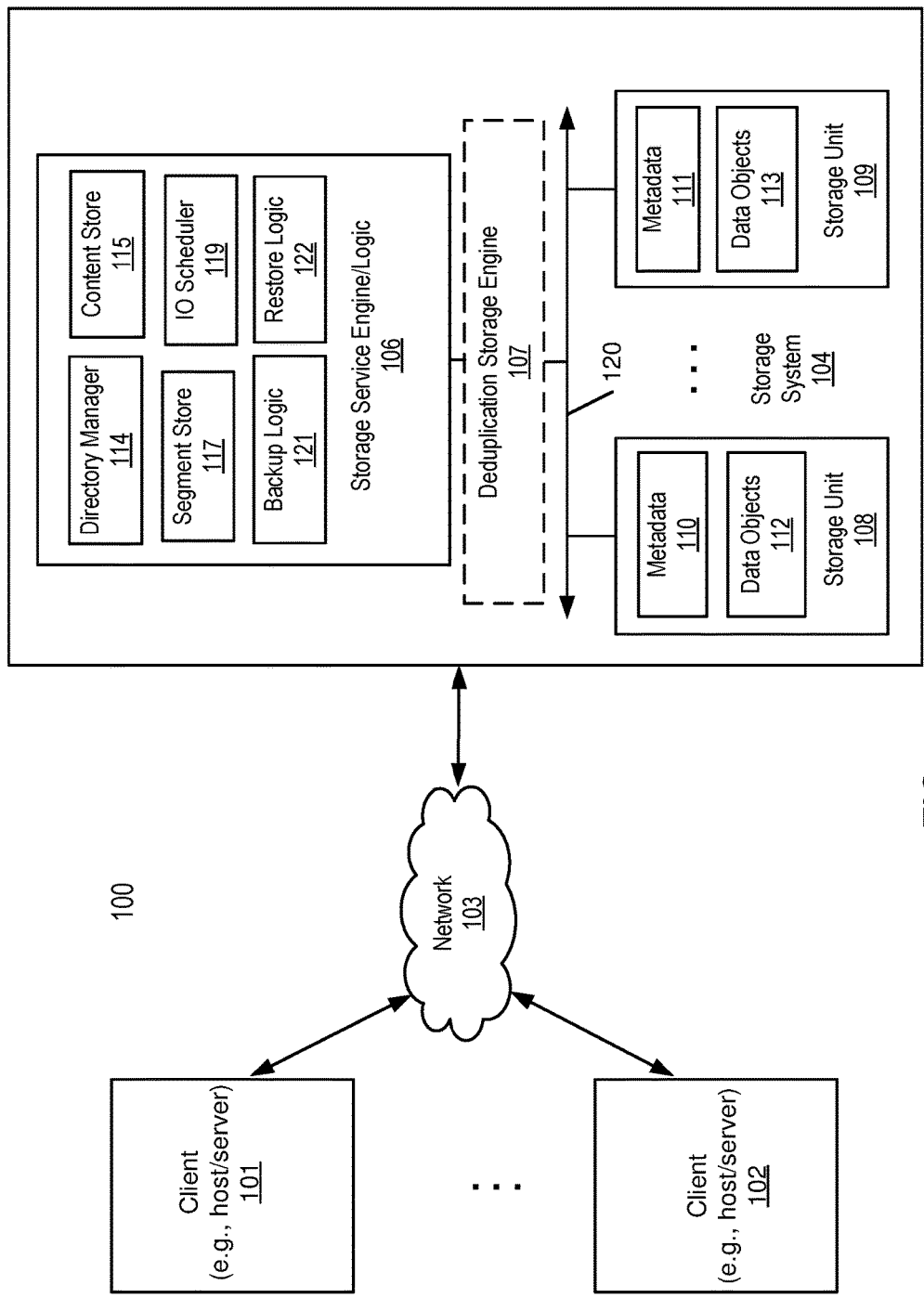
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to one aspect of the invention, in a mixed IO workload scenario, to provide required latency for random IO workload while ensuring sequential throughput requirements are met, a backup storage system may associate a predicted IO latency (or IO expiration time) with each of the random IO requests. The system may further maintain random IO requests and sequential IO requests in separate data structures, e.g., first-in, first-out (FIFO) queues, for submission to a disk storage. In one aspect, the backup storage system receives a plurality of input/output (IO) requests at the storage system. The IO requests include random IO requests and sequential IO requests. The storage system determines whether there is a pending random IO request from the plurality of IO requests. In response to determining that there is a pending random IO request, the storage system determines whether a total latency of the sequential IO requests exceeds a predicted latency of the pending random IO request. The storage system services the pending random IO request in response to determining that the total latency of the sequential IO requests exceeds the predicted latency of the pending random IO request.

According to another aspect of the invention, for each of the IO requests, the system determines whether the IO request is a sequential IO request or a random IO request. The system stores the IO request in an entry of a first data structure in response to determining that the IO request is a random IO request. The system stores the IO request in an entry of a second data structure in response to determining that the IO request is a sequential IO request.

According to another aspect of the invention, the system services the random IO requests and the sequential IO request(s) at an equal rate in response to determining that the total latency of the sequential IO requests does not exceed the predicted latency of the pending random IO request.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include directory manager 114, content store 115, segment store 117, IO scheduler 119, optional backup logic 121, and optional restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102). Directory manager 114 is configured to manage files stored in a file system of the storage system. Content store 115 may be configured to receive file segments requests from directory manager 114 and to retrieve the file segments from storage units 108-109 (via segment store 117). Segment store 117 may be configured to store and retrieve deduplicated segments to and from storage units 108-109. In another embodiment, segment store 117 includes deduplication storage engine 107 (not shown) and deduplicates file segments prior to storing the segments in storage units 108-109. IO scheduler 119 is configured to prioritize IO request transactions by maintaining different IO request operations (e.g., random IO request, sequential IO request) in separate data structures, e.g., first-in, first-out (FIFO) queues. Moreover, IO scheduler 119 may decide the order to service the IO request transactions based on an IO scheduling mechanism, as described in more detail herein below.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication storage engine or deduplication logic 107 is configured to segment the data file into multiple segments (also referred to as chunks) according to a variety of segmentation policies or rules. Deduplication storage engine 107 may be implemented as part of content store 115 and/or segment store 117. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2:
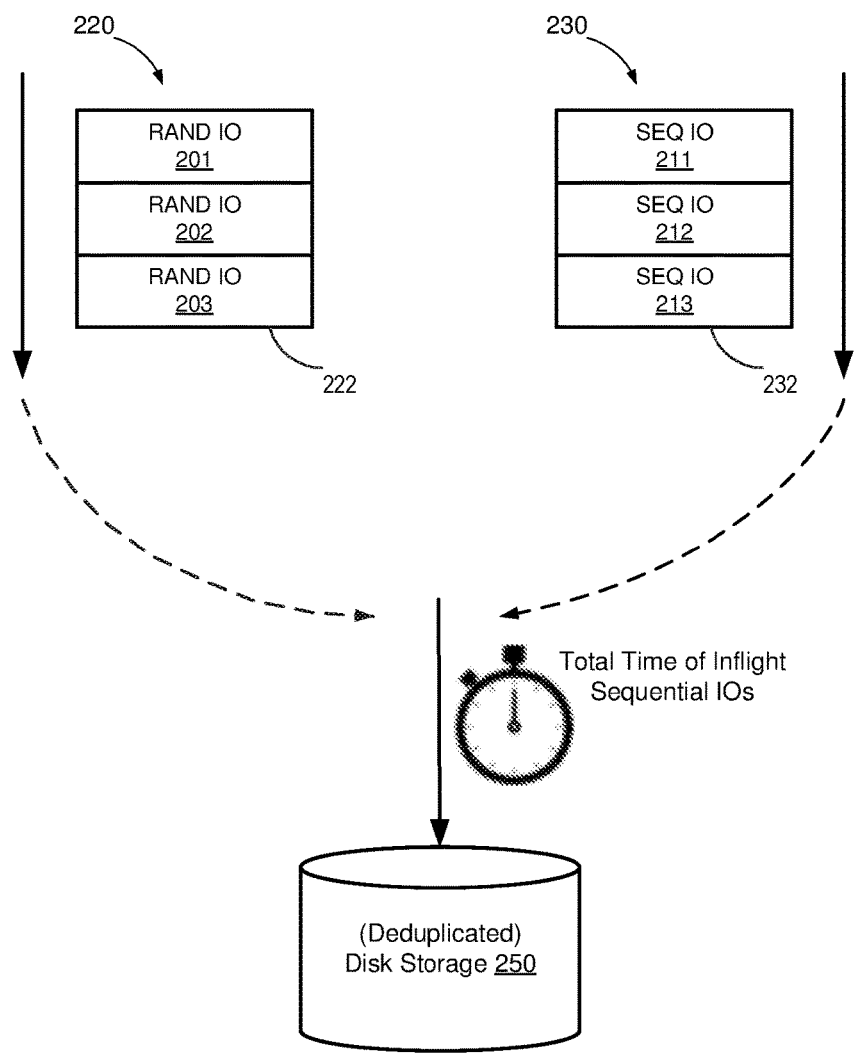
FIG. 2 is a block diagram illustrating an example of IO scheduling architecture according to one embodiment of the invention.

FIG. 2 is a block diagram illustrating an example of IO scheduling architecture according to one embodiment of the invention. In some embodiments, IO scheduling architecture 200 may be implemented as a part of storage system 104 of FIG. 1 (e.g., in IO scheduler 119 of FIG. 1).

As illustrated in FIG. 2, IO requests may be received at a storage system (e.g., storage system 104 of FIG. 1) from one or more client systems (e.g., clients 101-102 of FIG. 1). The IO requests (e.g., random IO requests 201-203 and sequential IO requests 211-213) may be stored in entries of a first data structure 220 (e.g., FIFO queue) and/or a second data structure 230 (e.g., FIFO queue) depending on the type of operation (e.g., random or sequential) of the IO requests. For example, as shown in FIG. 2, the first data structure 220 may be configured to only store random IO requests and second data structure 230 may be configured to only store sequential IO requests, in one embodiment. Each of the random IO requests may be associated with a predicted latency (RANDOM_LATENCY_MS) or expiration time, which may be measured in milliseconds (ms). The predicted latency (which may also be referred to as "cost") may be predetermined and may be a part of the random IO request (e.g., a field in the request) in one embodiment. Alternatively, in another embodiment, the predicted latency for each of the random IO requests may be separately maintained, for example in a table stored in a memory of the storage system.

In operation, to service each from the random IO requests 201-203 from data structure 220 and each of the sequential IO requests 211-213 from data structure 230, a total latency (or total cost) associated with inflight or incoming sequential IO requests (e.g., sequential IO requests 211-213) may be calculated and compared against a predicted latency of a random IO request (which may be extracted from the random IO request in one embodiment). For instance, if there is a pending random IO request (e.g., random IO request 203 stored in a head entry 222 of data structure 220), IO scheduling architecture 200 may determine whether the total latency of the inflight sequential IO requests exceeds the predicted latency of the pending random IO request. If so, the pending random IO request (e.g., random IO request 203) may be popped (or dequeued) from first data structure 220 and submitted (or sent) to disk storage 250 for service. Otherwise, the random and sequential IO requests may submitted to disk storage 250 for service at an equal rate. For example, in one embodiment, a "ping-pong" scheme may be utilized to service the IO requests such that for every sequential IO request being serviced, a random IO request is to be serviced, or vice versa. To illustrate this point, assuming at time T0 sequential IO request 213 (in head entry 232) is popped from data structure 230 and submitted to disk storage 250 for service. Subsequently, at time T1 random IO request 203 is submitted, at time T2 sequential IO request 212 is submitted, at time T3 random IO request 202 is submitted, and so on. In another embodiment, to service the random and sequential IO requests at an equal rate, the same number of random IO requests and sequential IO requests may take turn to be submitted to disk storage 250. As an example, at times T0 and T1 sequential IO request 213 and sequential IO request 212 are respectively submitted, at times T2 and T3 random IO request 203 and random IO request 202 are respectively submitted, and so on.

In some embodiments, the total latency of inflight sequential IO requests may be determined based on each latency associated with each of the sequential IO requests. The latency for each of the sequential IO request, for example, may be determined based on seek time of one or more storage devices (e.g., HDDs) within disk storage 250 to service the sequential IO request. To illustrate this point, as an example, assuming sequential IO request 213 takes 10 ms to service, sequential IO request 212 takes 5 ms to service, and sequential IO request 211 also takes 5 ms to service. In this scenario, the total latency of inflight sequential IO requests is 20 ms. Therefore, if the predicted latency of the pending random IO request (e.g., random IO request 203) is 15 ms, then the pending random IO request is to be submitted to the disk storage 250 for service.

Figure 3:
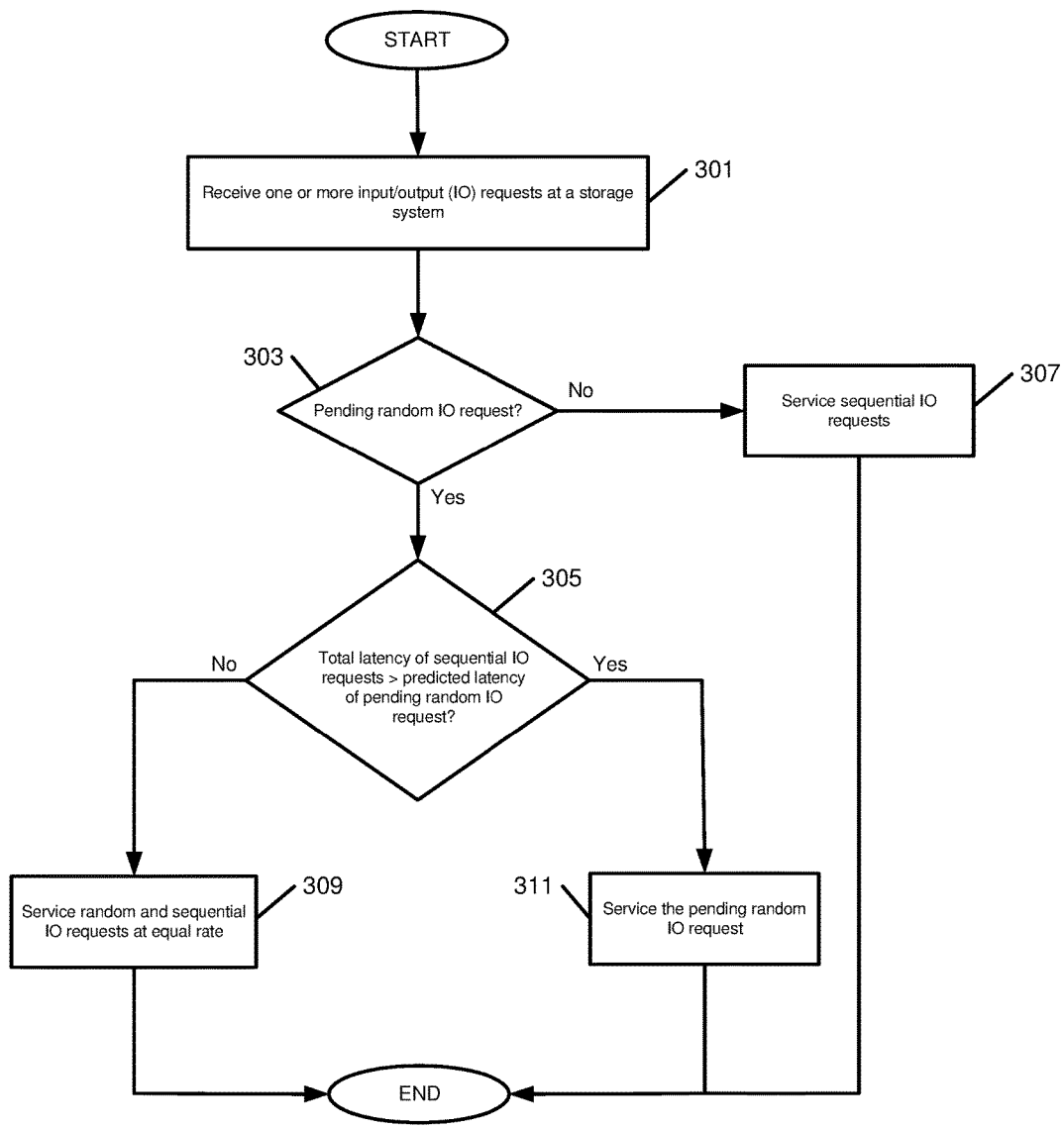
FIG. 3 is a flow diagram illustrating a method to schedule IO requests in a storage system according to one embodiment of the invention.

FIG. 3 is a flow diagram illustrating a method to schedule IO requests in a storage system according to one embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by storage system 104 of FIG. 1 (e.g., IO scheduler 119).

Referring to FIG. 3, at block 310, the processing logic receives one or more IO requests at a storage system (e.g., storage system 104 of FIG. 1). The IO requests may include random IO requests and sequential IO requests. At block 303, the processing logic determines whether there is a pending random IO request. If so, the processing logic continues to block 305. Otherwise the processing logic continues to block 307 to service the sequential IO requests. At block 305, the processing logic determines whether a total latency of the sequential IO requests exceeds a predicted latency of the pending random IO request. If so, the processing logic continues to block 311 to service the pending random IO request. Otherwise, the processing logic continues to block 309 to service the random and sequential IO requests at an equal rate (as previously described).

Figure 4:
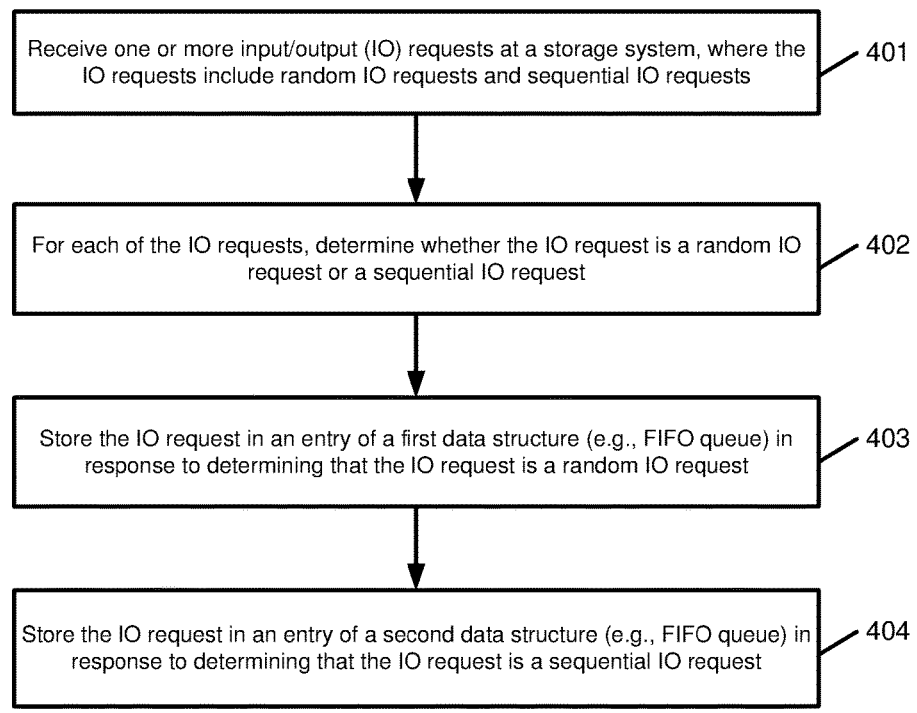
FIG. 4 is a flow diagram illustrating a further method to schedule IO requests in a storage system according to one embodiment of the invention.

FIG. 4 is a flow diagram illustrating a further method to schedule IO requests in a storage system according to one embodiment of the invention. Process 400 may be performed by processing logic that includes hardware (e.g. circuitry, dedicated logic, etc.), software (e.g., embodied on a non-transitory computer readable medium), or a combination thereof. For example, process 300 may be performed by storage system 104 of FIG. 1 (e.g., IO scheduler 119).

Referring to FIG. 4, at block 401, the processing logic receives one or more input/output (IO) requests at a storage system, where the IO requests include random IO requests and sequential IO requests. At block 402, for each of the IO requests, the processing logic determines whether the IO request is a random IO request or a sequential IO request. At block 403, the processing logic stores the IO request in an entry of a first data structure (e.g., FIFO queue) in response to determining that the IO request is a random IO request. At block 404, the processing logic stores the IO request in an entry of a second data structure (e.g., FIFO queue) in response to determining that the IO request is a sequential IO request.

Note that some or all of the components as shown and described above (e.g., content store 115 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
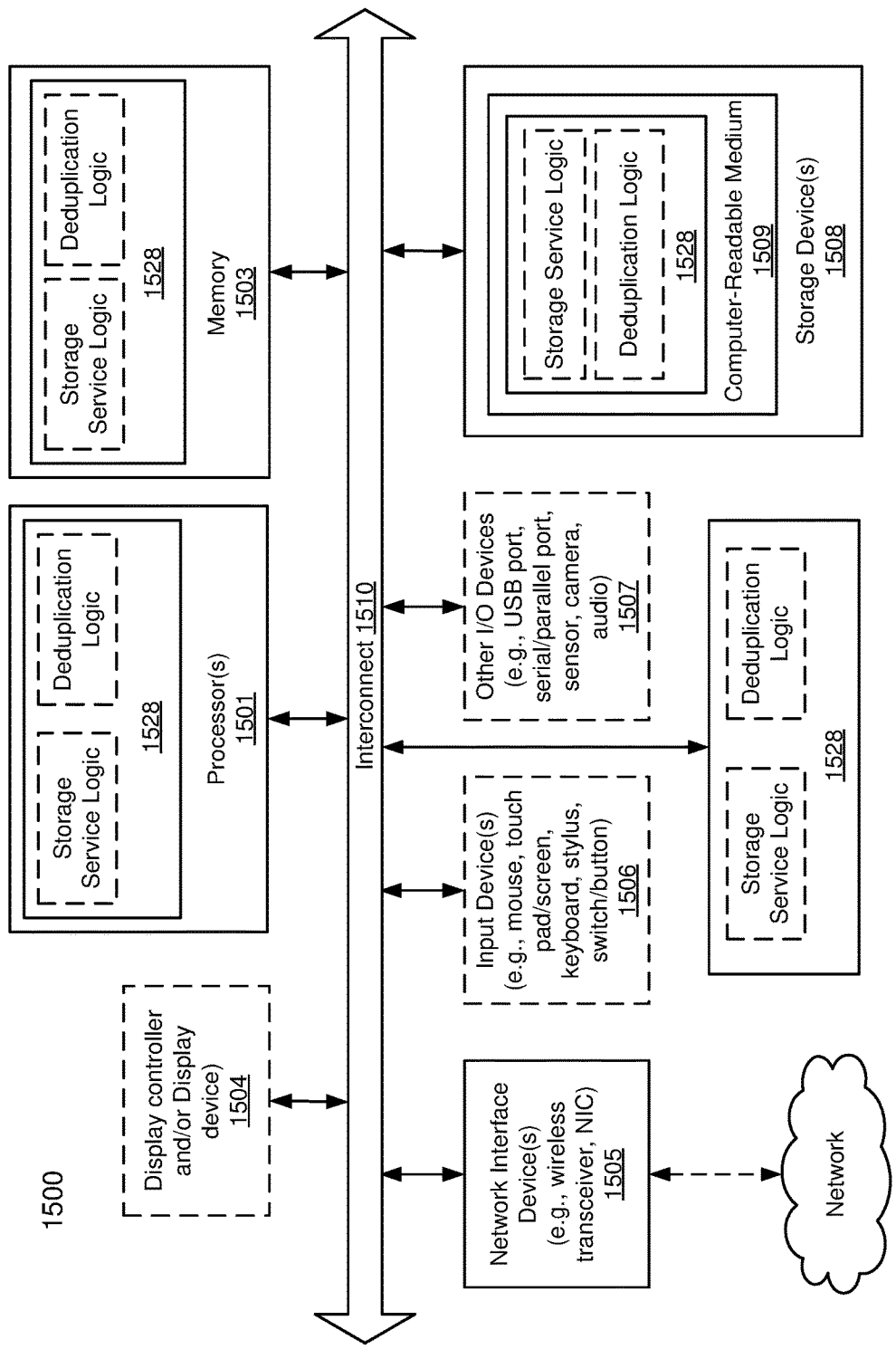
FIG. 5 is a block diagram illustrating a data processing system according to one embodiment.

FIG. 5 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for input/output (IO) scheduling for a storage system, the method comprising:
   receiving a plurality of input/output (IO) requests at the storage system, the IO requests including random IO requests and sequential IO requests;
   determining whether there is a pending random IO request from the plurality of IO requests;
   in response to determining that there is a pending random IO request, determining whether a total latency of the sequential IO requests exceeds a predicted latency of the pending random IO request; and
   servicing the pending random IO request in response to determining that the total latency of the sequential IO requests exceeds the predicted latency of the pending random IO request.

2. The method of claim 1, further comprising for each of the IO requests,
   determining whether the IO request is a sequential IO request or a random IO request;
   storing the IO request in an entry of a first data structure in response to determining that the IO request is a random IO request; and
   storing the IO request in an entry of a second data structure in response to determining that the IO request is a sequential IO request.

3. The method of claim 1, further comprising servicing the random IO requests and the sequential IO request(s) at an equal rate in response to determining that the total latency of the sequential IO requests does not exceed the predicted latency of the pending random IO request.

4. The method of claim 2, wherein the pending random IO request is stored in a head entry of the first data structure.

5. The method of claim 1, further comprising computing the total latency of the sequential IO requests based on seek time of one or more storage devices in the storage system.

6. The method of claim 1, further comprising associating a predicted latency with each of the random IO requests.

7. The method of claim 1, wherein the predicted latency of the pending random IO request is extracted from the pending random IO request.

8. A non-transitory machine-readable medium having instructions stored therein, which when executed by a processor, cause the processor to perform operations for, the operations comprising:

receiving a plurality of input/output (IO) requests at the storage system, the IO requests including random IO requests and sequential IO requests;

determining whether there is a pending random IO request from the plurality of IO requests;

in response to determining that there is a pending random IO request, determining whether a total latency of the sequential IO requests exceeds a predicted latency of the pending random IO request; and servicing the pending random IO request in response to determining that the total latency of the sequential IO requests exceeds the predicted latency of the pending random IO request.

9. The non-transitory machine-readable medium of claim 8, wherein the operations further comprise:

for each of the IO requests, determining whether the IO request is a sequential IO request or a random IO request;

storing the IO request in an entry of a first data structure in response to determining that the IO request is a random IO request; and storing the IO request in an entry of a second data structure in response to determining that the IO request is a sequential IO request.

10. The non-transitory machine-readable medium of claim 8, wherein the operations further comprise servicing the random IO requests and the sequential IO request(s) at an equal rate in response to determining that the total latency of the sequential IO requests does not exceed the predicted latency of the pending random IO request.

11. The non-transitory machine-readable medium of claim 9, wherein the pending random IO request is stored in a head entry of the first data structure.

12. The non-transitory machine-readable medium of claim 8, wherein the operations further comprise computing the total latency of the sequential IO requests based on seek time of one or more storage devices in the storage system.

13. The non-transitory machine-readable medium of claim 8, wherein the operations further comprise associating a predicted latency with each of the random IO requests.

14. The non-transitory machine-readable medium of claim 8, wherein the predicted latency of the pending random IO request is extracted from the pending random IO request.

15. A data processing system, comprising:

a processor; and a memory coupled to the processor to store instructions, which when executed by the processor, cause the processor to perform operations, the operations comprising:

receiving a plurality of input/output (IO) requests at the storage system, the IO requests including random IO requests and sequential IO requests;

determining whether there is a pending random IO request from the plurality of IO requests;

in response to determining that there is a pending random IO request, determining whether a total latency of the sequential IO requests exceeds a predicted latency of the pending random IO request; and servicing the pending random IO request in response to determining that the total latency of the sequential IO requests exceeds the predicted latency of the pending random IO request.

16. The data processing system of claim 15, wherein the operations further comprise:

for each of the IO requests, determining whether the IO request is a sequential IO request or a random IO request;

storing the IO request in an entry of a first data structure in response to determining that the IO request is a random IO request; and storing the IO request in an entry of a second data structure in response to determining that the IO request is a sequential IO request.

17. The data processing system of claim 15, wherein the operations further comprise servicing the random IO requests and the sequential IO request(s) at an equal rate in response to determining that the total latency of the sequential IO requests does not exceed the predicted latency of the pending random IO request.

18. The data processing system of claim 16, wherein the pending random IO request is stored in a head entry of the first data structure.

19. The data processing system of claim 15, wherein the operations further comprise computing the total latency of the sequential IO requests based on seek time of one or more storage devices in the storage system.

20. The data processing system of claim 15, wherein the operations further comprise associating a predicted latency with each of the random IO requests.

\* \* \* \* \*